Feb. 4, 1930.
R. E. BISSELL ET AL
1,745,886
PROCESS OF MAKING COMPOSITE METAL ARTICLES
Filed Dec. 30, 1927
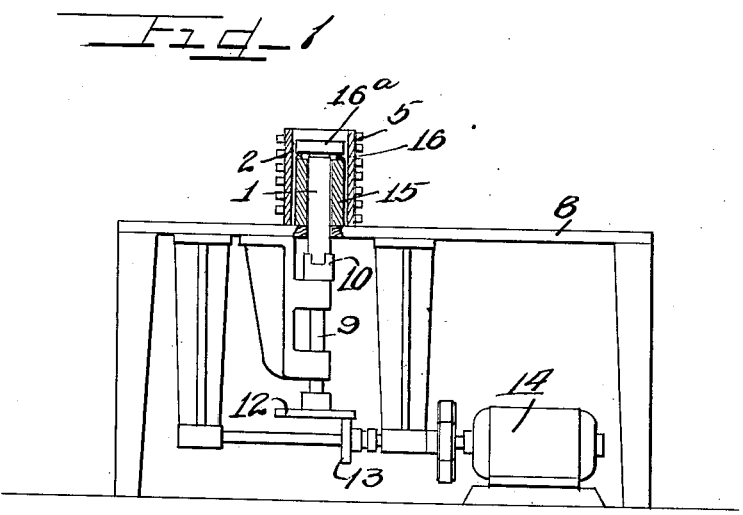
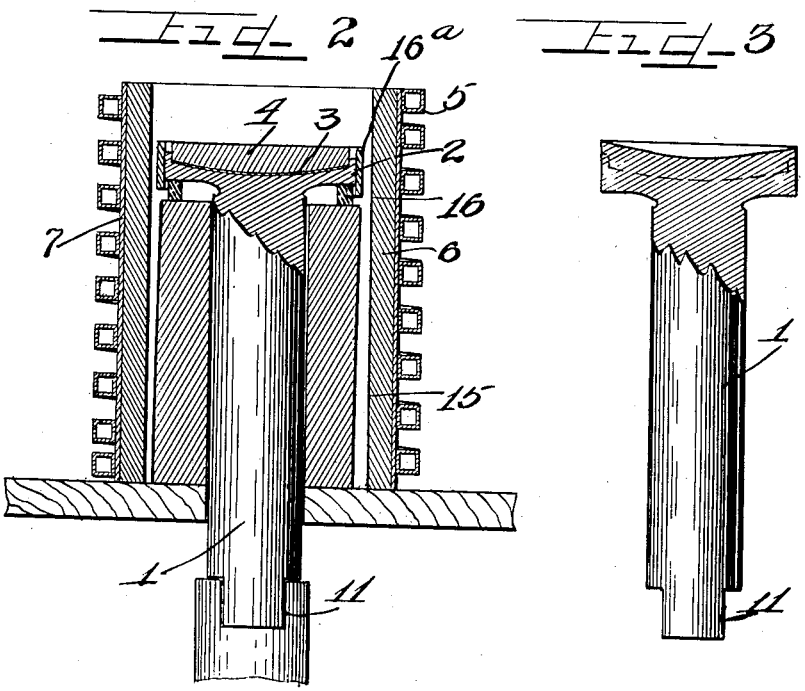

Patented Feb. 4, 1930

1,745,886

UNITED STATES PATENT OFFICE

RICHARD E. BISSELL AND CLARENCE W. MILLER, OF CLEVELAND, OHIO, ASSIGNORS TO THOMPSON PRODUCTS, INC., OF CLEVELAND, OHIO, A CORPORATION OF OHIO

PROCESS OF MAKING COMPOSITE METAL ARTICLES

Application filed December 30, 1927. Serial No. 243,547.

This invention relates to a process of making a composite metal article and has particular reference to a valve tappet structure embodying a steel body having a head or face of cast iron or other long wearing material which mates well with a hardened surface.

Previous processes for the production of tappets with cast iron heads or faces have been objectionably expensive and the articles made thereby have been defective in that the faces thereof often contain objectionable blow holes and are not properly joined to the body portion.

An important object of the present invention therefore resides in the economical production of such articles by the employment of an induced electric current (preferably of high frequency) in effecting the jointure of the composite parts.

Another important object of this invention is to economically produce an article of the kind described by a process which assures a strong joint and a homogeneous face which is free from blow holes.

Other and further important objects of this invention will be apparent from the disclosures in the specification and the accompanying drawing.

Apparatus adapted to carry out the process of the present invention is diagrammatically shown in the accompanying drawing wherein:

Figure 1 is a side elevation with parts in section illustrating the apparatus.

Figure 2 is an enlarged vertical section with parts in elevation showing the form of heating means employed in carrying out the process of this invention.

Figure 3 is a side elevation with a part in section showing a valve tappet made by the process of this invention prior to machining or grinding the face.

The process embodying this invention is carried out by taking a steel stem or tappet body portion 1 and forming a slight concave recess with vertical walls in the flanged head 2 thereof. A wetting flux 3, such for example as sodium silicofluoride ($Na_2SiF_6$) is placed in this concavity or recess and a button 4 of cast iron or similar material which it is desired to apply to the face of the tappet is preheated and then placed in the concavity or depression on the flux 3. The cast iron button 4 is melted to the body portion by inducing an electric current of high frequency therein in a manner which will now be described.

The means for inducing the high frequency electric current to melt the button 4 to the flanged head 2 to the body portion or stem 1 comprises an electric inductor of the general type shown and described in United States Letters Patent No. 1,328,336, granted to E. F. Northrup on January 20th, 1920, and includes a water-cooled primary coil 5 which is mounted on an alundum or quartz cylinder 6 over an interposed sheet of asbestos or similar material 7. This high frequency inductor is preferably supported on a table or suitable base 8 beneath which is mounted a mechanism for rotating the stem 1 during the time that the high frequency electric heating current is being induced therein. Although any suitable form of mechanism for so rotating the stem may be provided, I have shown as an example a vertical shaft 9 which is provided at its upper end with a chuck 10 to receive the flattened end of the stem 1 and which is provided at its lower end with a friction driven plate 12 which is frictionally driven by a friction wheel 13 mounted on the drive shaft of an electric motor 14.

That portion of the stem or body 1 which is mounted inside the alundum cylinder of the inductor may be surrounded by a body of fireclay or similar refractory material 15, if desired, and in order to prevent undue melting away of the edges of the flanged head 2 an annulus of transite board or similar insulating material 16 is positioned underneath the outer edge of said flanged head to divert the induced current inwardly. We have found that the fireclay 15 may in many instances be dispensed with in the event of the annulus 16 of transite board or the like is conveniently secured to the underside of the flanged head 2 in the position shown in Figure 2 by means of a suitable cement such as sodium silicate.

In carrying out the process of our invention, the stem or body portion is first placed in position inside the cylinder 6 of the inductor with the annulus 16 either cemented thereto or supported on the fireclay 15 in contact therewith. A collar 16ª of suitable material such as asbestos is placed around the flanged head as shown in Figure 2 to prevent splashing out of the melted iron by centrifugal action. The wetting flux 3 is then applied to the concavity or depression in the flanged head 2 and the button of cast iron or other metal which it is desired to melt to the face is preheated and placed in position in the fluxed concavity. The stem and button are then rotated and current of high frequency is caused to flow in the water-cooled primary 5 of the inductor. This induces a heating current in the button 4, in the flanged portion 2 and in the stem or body portion 1 which serves to melt the button to the body portion. The placing of a flux such as described in the concavity or recess prevents oxidation which causes blow holes and the rotation of the article during melting operation serves to bring about a centrifugal action which renders the face homogeneous in character. The intense heat induced in the button and in the head of the body portion, of course, melts the button to the head and effects a substantial jointure thereof. The head and body portion may then be subjected to a drastic quench (preferably while rotation is continued), the result being an article having a structure such as shown in Figure 3 which may be readily machined or ground to provide the desired face which is of homogeneous material that readily mates with a hardened surface such as cams on the cam shaft of an internal combustion engine.

It will be apparent that the foregoing process, while peculiarly adaptable to the making of valve tappets, is also susceptible of use in the production of a variety of composite metal articles.

We are aware that various details in the carrying out of this process and materials used may be changed without departing from the principles of this invention, and we therefore do not purpose limiting the patent granted on this invention otherwise than necessitated by the prior art.

We claim as our invention:

1. The process of applying a metal head to a metal article having different characteristics than the head comprising supporting the head material on the article and rotating the article and head material in a high frequency electro-magnetic field until the head and article are welded together by the flow of induced high frequency current therethrough.

2. The process of applying a metal head to a metal article having different characteristics than the head comprising supporting the head material on a fluxed portion of the article and rotating the article and head material in a high frequency electro-magnetic field until the head and article are welded together by the high frequency electric current induced therein.

3. The process of applying a metal head to a metal article having different characteristics than the head comprising preheating the head material and placing it on the upper portion of the article and then rotating the article and head material in a high frequency electro-magnetic field until the head material is melted in place on the article by the current induced therein.

4. The process of applying a cast iron head to a steel stem comprising recessing an enlarged end of the stem, placing a fluxing agent in the recess, placing a preheated cast iron button in the recess, and rotating the stem and button in the field of a high frequency electric inductor until the button is melted to the stem.

5. The process of applying a cast iron head to a steel stem comprising recessing an enlarged end of the stem, placing a fluxing agent in the recess, placing a cast iron button in the recess, and rotating the stem and button in the field of a high frequency electric inductor until the button is melted to the stem.

6. The process of applying a cast iron head to a steel stem comprising recessing an end of the stem, placing a preheated cast iron button in the recess, and rotating the stem and button in the field of a high frequency electric inductor until the button is melted to the stem.

7. The process of applying a cast iron head to a steel stem comprising recessing the end of the stem, applying a wetting flux to the recess, placing a cast iron button in the recess on the flux, and melting the button to the stem by inducing a high frequency electric current therein.

8. The process of applying a cast iron head to a steel stem having a flanged head portion comprising placing a cast iron button on said head, positioning a heat resisting insulating member beneath the flange on the head, and melting the button to the stem by inducing a high frequency electric current therein.

9. The process of applying a cast iron head to a steel stem having a flanged head portion comprising placing a cast iron button on said head, positioning a heat resisting insulating member beneath the flange on the head, melting the button to the stem by inducing a high frequency electric current therein, and rotating the parts during the melting operation.

In testimony whereof, we have hereunto subscribed our names at Cleveland, Cuyahoga County, Ohio.

RICHARD E. BISSELL.
CLARENCE W. MILLER.